United States Patent [19]

Sullivan

[11] 4,408,792
[45] Oct. 11, 1983

[54] CAB-MOUNTED FAIRING

[76] Inventor: Patrick F. Sullivan, 3645 Glen Oak, Eugene, Oreg. 97405

[21] Appl. No.: 245,397

[22] Filed: Mar. 19, 1981

[51] Int. Cl.³ .............................................. B62D 35/00
[52] U.S. Cl. ..................................... 296/1 S; 105/2 R
[58] Field of Search ................. 296/1 S, 91; 105/2 R, 105/2 H

[56] References Cited

U.S. PATENT DOCUMENTS

| | | | |
|---|---|---|---|
| 4,018,472 | 4/1977 | Mason | 296/1 S |
| 4,084,846 | 4/1978 | Wiley | 296/1 S |
| 4,087,124 | 5/1978 | Wiley | 105/2 R |
| 4,093,300 | 6/1978 | Snizek | 296/91 |

*Primary Examiner*—Joseph F. Peters, Jr.
*Assistant Examiner*—John A. Carroll
*Attorney, Agent, or Firm*—Chernoff, Vilhauer, McClung, Birdwell & Stenzel

[57] ABSTRACT

A fairing for mounting atop the cab of a motor vehicle such as a tractor unit of a tractor-trailer truck includes feet for supporting an aerodynamically-shaped, thin-walled hollow front member and a rear panel which substantially closes the rear side of the fairing to reduce the lifting effects of turbulent air flow. The fairing includes feet and legs which support the fairing spaced above the vehicle cab to provide visibility for cab top-mounted clearance lights. The fairing may be manufactured of fiberglass reinforced resin sheet material, with the rear panel providing sufficient support for the front member despite hollow thin-walled construction.

9 Claims, 7 Drawing Figures

U.S. Patent    Oct. 11, 1983    4,408,792
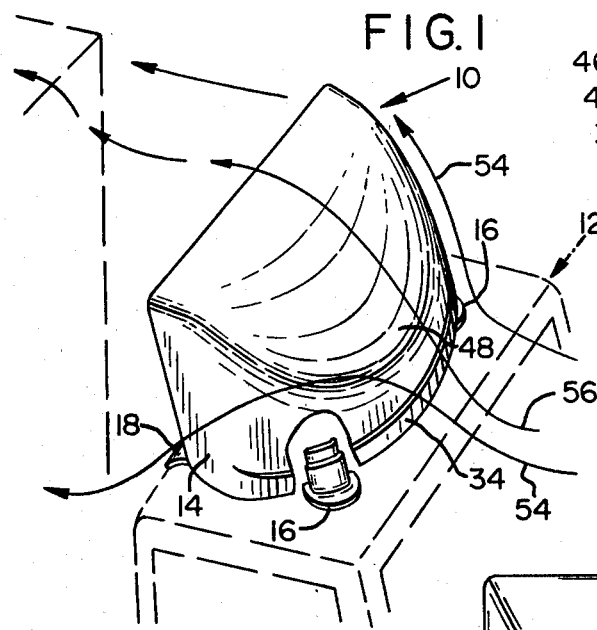
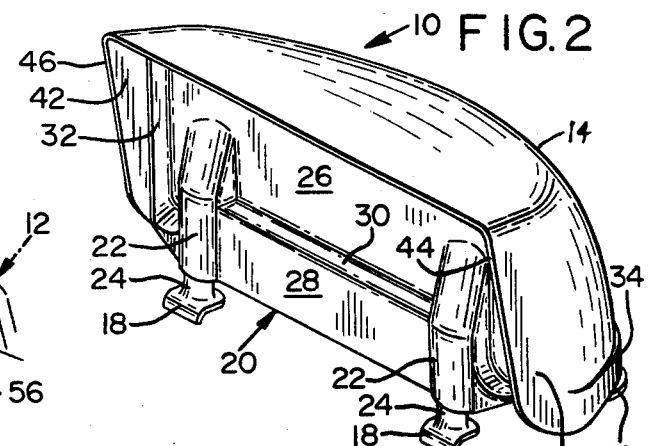
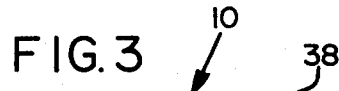
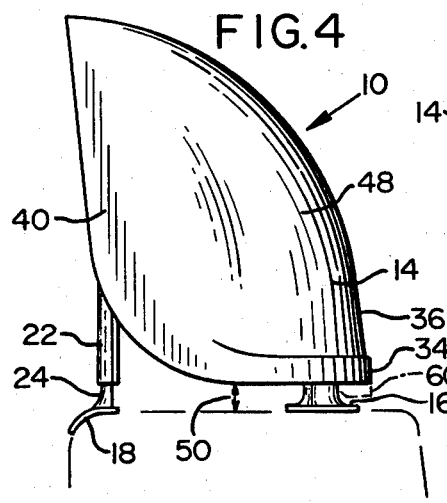
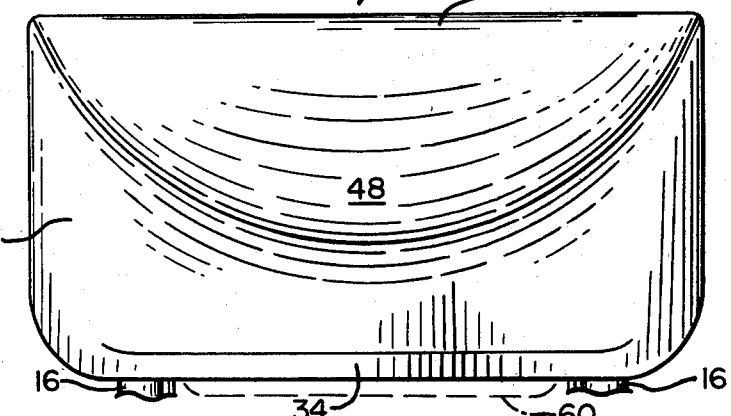
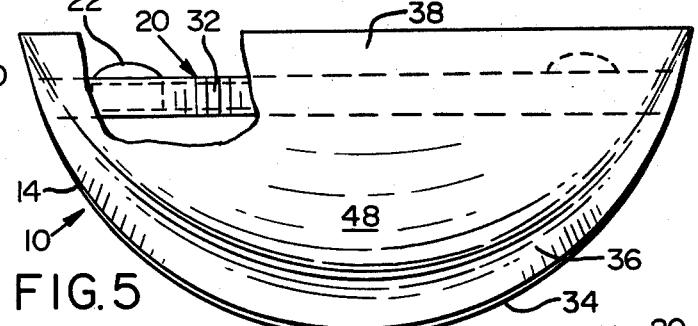
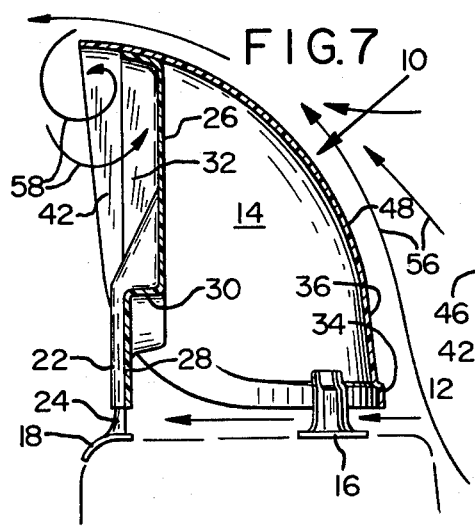

CAB-MOUNTED FAIRING

BACKGROUND AND SUMMARY OF THE INVENTION

The present invention relates to an improved fairing for mounting atop the operator's cab of a vehicle, particularly a truck, for reducing air resistance to forward movement of such a vehicle.

The generally flat, vertical forward surface of a large truck's cargo box or trailer usually extends higher than the top of the cab of the truck or its tractor unit, generating enough turbulence as the vehicle is operated to significantly affect fuel consumption. Air deflectors and fairings for mounting on top of the cabs of trucks are well known, particularly those designed for mounting atop the cab of a tractor unit of a tractor-trailer truck. Such fairings are used to provide a smoother pattern of flow or air over the top of the cab and along the top and sides of the trailer of such a truck in order to achieve increased fuel economy.

For example, Saunders U.S. Pat. No. 3,241,876 discloses deflectors which extend upwardly at a rearwardly inclined slope to cause the flow of air to separate from the top of a truck cab and to create an eddy between the rear of the deflector and the front of a trailer unit or box of such a truck. Other previously known devices are similar to the shape of a "V" blade snow plow or comprise transversely oriented rearwardly sloping convexly curved plates to be mounted on top of a cab at an appropriate angle to improve air flow patterns.

While the above-described devices provide a decrease in air resistance to a truck as a whole, the devices themselves are subject to the force of eddying currents of air which develop behind and beneath such devices, tending to lift them from their mounting position, or causing the devices to vibrate and rattle annoyingly, and making leaks through the cab top likely.

These previously known devices often require relocation of clearance lights atop a truck cab, in order to retain visibility of such lights when the air deflector is mounted in the proper location for effectiveness.

In order to overcome the aforementioned shortcomings of previously known cab-mounted fairings, the present invention provides a cab-mounted fairing which provides improved patterns of air flow around a moving vehicle, yet is not susceptible to being lifted from a vehicle cab by self-created turbulence.

The preferred embodiment of the fairing of the present invention comprises two major parts which are securely fastened to one another: a front member having an appropriate aerodynamic shape, and a rear panel extending generally vertically within an open rear side of the front member, closing the rear side of the fairing as a whole, thus substantially preventing turbulent air flow from acting on most of the underside of the fairing.

The preferred fairing of the invention is mounted on top of a vehicle on feet which support the fairing a predetermined distance above the top of the truck cab, providing visibility of clearance lights, located on the cab top, without requiring these lights to be relocated when the fairing is installed. The feet also permit the fairing to be mounted on cabs of various dimensions and contours by adjusting the location of the feet or using different feet to fit different vehicles.

It is therefore a primary objective of the invention to provide an improved fairing for reducing the air resistance of a vehicle such as a truck.

It is another important objective of the present invention to provide a cab-mounted aerodynamic fairing which is not susceptible to being lifted from the top of a vehicle by air turbulence.

It is a further objective of the present invention to provide a fairing which may be mounted on cab tops of different lengths.

It is a primary feature of the present invention that it provides a cab-mounted fairing whose back side is closed to reduce the effects of wind turbulence which would otherwise tend to lift the fairing from the cab top.

It is another important feature of the present invention that it provides a cab-mounted fairing having a rigid yet light-weight construction incorporating a rear panel located supportingly within the front member to provide internal support for the aerodynamic shape of the front member.

It is another feature of the present invention that is provides a fairing having an aerodynamic shape which promotes smooth flow of air around both the cab and the cargo-carrying body of a truck while preserving visibility of clearance lights mounted atop the cab of the vehicle.

It is a primary advantage of the present invention that it provides a fairing which is less susceptible than previously known cab-mounted fairings to being lifted free from the top of the cab on which it is mounted.

It is another important advantage of the present invention that it provides a cab-mounted fairing having greater strength than previously known fairings.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a partially cut away pictorial view of a fairing incorporating the present invention mounted on the top of a truck cab.

FIG. 2 is a pictorial view from the rear of the fairing shown in FIG. 1, at an enlarged scale.

FIG. 3 is a front elevational view of the fairing shown in FIGS. 1 and 2, at an enlarged scale.

FIG. 4 is a right side elevational view of the fairing shown in FIG. 3.

FIG. 5 is a partially cut away top view of the fairing shown in FIG. 3.

FIG. 6 is a rear elevational view of the fairing shown in FIG. 3.

FIG. 7 is a sectional view of the fairing shown in FIG. 6 taken along the line 7—7.

DETAILED DESCRIPTION OF THE DRAWINGS

Referring now to the drawings, FIG. 1 shows an exemplary fairing 10 according to the present invention installed atop the cab 12 of a truck. The fairing 10 may be seen to comprise an aerodynamically shaped front member 14 supported by a pair of front feet 16 and (referring now also to FIG. 2) a pair of rear feet 18. A rear panel 20 includes a pair of sockets 22 attached thereto to receive the rear legs 24 associated with the rear feet 18, which may be bolted or adhesively secured in place. The sockets 22 and legs 24 have an approximately semicylindrical shape permitting the legs 24 to swivel slightly in the sockets 24 to conform to the shape of a cab 12.

Referring also now to FIGS. 3–7, it may be seen that the front member 14 and rear panel 20 are of thin-walled construction. They may preferably be formed of a sturdy lightweight material, such as a fiberglass-reinforced resin, permitting the fairing 10 to be conveniently molded as a strong, lightweight unit with a wall thickness of approximately 5/16 inch, using well known techniques.

The rear panel 20 extends transversely and generally vertically, and includes an upper portion 26, a rearwardly offset lower portion 28, which is parallel with the upper portion 26, and a horizontal intermediate portion 30 interconnecting the upper portion 26 with the lower portion 28. A rearwardly extending flange 32 is located along the generally vertical side edges and generally horizontal top edge of the rear panel 20. The offset provided by the horizontal portion 30 between upper and lower portions 26 and 28, and the flange 32, make the rear panel 20 as a unit considerably stiffer than a simple flat sheet of similar material having the same overall dimensions and thickness.

The edge contour of the flange 32 corresponds to the interior shape of the front member 14. The flange 32 thus provides not only support for the rearward part of the front member 14, but additionally provides stiffening support for the aerodynamic shape of the front member 14, making it possible for the front member 14 to be formed of thinner material than would be necessary for an unsupported unit. The flange 32 may be connected to the interior of the front member 14 in any manner which will hold the rear panel 20 securely to the front member 14. For example, the front member 14 and rear panel 20 may be adhesively connected to one another using well-known reinforced resin construction techniques, or plow bolts or carriage bolts (not shown) may extend through the front member 14 and the flange 32, with the bolt heads on the exterior side of the front member 14.

The front feet 16 may be attached to the interior of the front member 14 at appropriate positions in a similar fashion.

In a preferred embodiment of the invention, the front member 14 includes a forward lower edge rim 34 which is outwardly offset from the upwardly adjacent portion of the fairing. The rim 34 stiffens the front member 14 of the of the fairing to permit use of thin wall construction yet have sufficient rigidity. Extending above the forward lower edge rim 34 is a nearly vertical but rearwardly sloping lower front area 36 which extends as a belt along the lower edge rim 34, with an angle of about 5 degrees rearward of vertical. A rear edge 38 extends horizontally defining the top of the front member 14, which slopes forward and downward from the rear edge 38. Flat, generally vertical side panels 40 and 42 are faired smoothly into the rearwardly sloping area 36 and have rearwardly sloping side edges 44 and 46 defining the rear extremity of the front member 14. The side panels 40 and 42 diverge slightly from each other, the side edges 44 and 46 being separated farther from one another than the forward portions thereof. Interconnecting the horizontal rear edge 38, the rear side panels 40 and 42, and the rearwardly sloping lower front area 36, is a convexly arcuate surface 48 which approximates a perturbed paraboloid of revolution. The convex surface 48 is faired smoothly into the top of the rearwardly sloping lower front area 36, the front of each of the side panels 40 and 42, and the rear edge 38.

The rear panel 20 extends generally vertically within the interior of the front portion 14, greatly reducing the area exposed to forwardly and upwardly directed eddies of wind, as the vehicle on which the fairing 10 is mounted moves forward. The rear panel 20 is located as near the horizontal rear edge 38 of the front member 14 as practical, in view of the length of the cab on which the fairing 10 is mounted, but may be located farther forward within the front member 14, and may have a corresponding smaller size, in order to allow the rear feet 18 to be securely mounted on a truck cab 12 whose length from front to rear is unusually short. This permits the fairing 10 to be mounted on top of a truck cab 12 with the forward lower edge rim 34 extending to within about 5 to 10 inches from the front edge 50 of the top of the cab 12 while the downwardly curved feet 18 extend around the curved rear edge of the cab 12. Preferably the feet 16 and 18 are bolted or riveted to the top of the cab 12, and a caulking compound is used to prevent leakage of rain.

Since clearance lights are normally required to be mounted on the top of a truck cab 12 for night operation, the fairing 10 may be installed to provide sufficient clearance (for example, about 4 inches) between the lowest edges of the fairing 10 and the cab top surface, as indicated by the arrow 50. With the fairing mounted in such a position substantially all air currents nevertheless pass upward along the outer surface of the fairing 10 because of the upward motion normally imparted to the airstream by the windshield of the truck cab 12. Air thus flows around the sides of the fairing 10 as indicated by the arrows 54 and upward and along the top of the fairing 10 as indicated by the arrows 56. Only a small portion of the interior of the front member 14 is exposed to eddies such as those indicated by the arrows 58, because the rear panel 20 blocks access to the interior of the front member 14 from the rear. Although the bottom of the fairing 10 is open downwardly toward the top of the cab 12, the amount of turbulence and lift within the front member 14 is minimal because of the predominant stream of air flow as indicated by the arrows 54 and 56. Any annoying whistling which may result may be controlled by varying the height of the fairing 10 above the cab 12 or by extending the rim 34, as by adding a downwardly extending skirt 60 along a portion thereof.

While it is also possible to mold a fairing of this type as a unit including a rear panel and a front member integrally formed, without any rearward extension of the aerodynamic shape rearward of the rear panel, and to mount such a fairing tightly to the top of a vehicle cab, the separately molded pieces described above are preferred, since they provide equal strength to resist air pressure from ahead with lighter overall fairing weight. Additionally, the rear panel 20 provides structural support for the shape of the front member 14 in the first above-described fairing 10, while separate production of the rear panel 20 provides a fairing which is less expensive to ship, since several pieces can be nested for shipment.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A fairing for mounting atop the cab of a vehicle such as a truck for improving the flow of air around the vehicle, comprising:
   (a) an aerodynamic front member having a forwardly convex shape for reducing the turbulence of the flow of air around the top and sides of a vehicle, said front member including an arcuate, substantially horizontal forward lower edge extending rearwardly on each side, a rear edge extending transversely and side edges extending downward on each respective side of said front member, from said rear edge toward said forward lower edge, defining a concave interior of said front member; and
   (b) substantially vertically-extending transverse rear panel means fixedly attached to said front member proximate said rear and side edges, for substantially blocking forward movement of air against the interior of said front member.

2. An aerodynamic fairing for mounting atop the cab of a vehicle, comprising:
   (a) a downwardly and rearwardly open hollow front member having an aerodynamic exterior shape, including an arcuate, substantially horizontal forward lower edge which extends rearwardly along each side of said front member, a pair of generally upright side edges, and a rear edge extending transversely between and interconnecting said side edges proximate the tops thereof, said front member including a substantially convexly arcuate surface extending upwardly and rearwardly from said forward lower edge to said rear and side edges for deflecting a stream of air upward and sideward, and including a concave interior;
   (b) substantially vertical transverse rear panel means having a pair of generally vertical opposite side edges and a transverse top edge, said side edges and top edge being fixedly interconnected with said front member at a location proximate said rear and side edges of said front member, for blocking forward movement of air into the interior of said front member; and
   (c) support means for fastening said front member and said rear panel of the cab of a vehicle.

3. The aerodynamic fairing of claim 2 wherein said rear panel means has peripheral flange means for interconnecting said rear panel means and said front member.

4. The fairing of claim 2 wherein said rear panel means comprises a substantially planar upper portion and a substantially planar lower portion and includes transverse generally horizontal intermediate means located between said upper and lower portions, for stiffening said rear panel means.

5. The fairing of claim 2 wherein said rear panel means comprises a substantially planar upper portion and an offset substantially planar lower portion interconnected with one another by transverse generally horizontal intermediate means for stiffening said rear panel means.

6. The fairing of claim 2, further comprising a pair of front feet and means for fastening said front feet to said front member and a pair of rear feet each having an upwardly-extending rear leg connected therewith, wherein said rear panel means includes socket means for receiving said rear legs, said front and rear feet extending, respectively, below said front member and said rear panel means a distance sufficient for supporting said fairing spaced a predetermined distance above the cab of a vehicle.

7. The fairing of claim 6 wherein said predetermined distance is sufficient to permit substantially unobstructed visibility of lights mounted on the top of said cab, from both ahead of and behind said cab.

8. The fairing of claim 2 wherein said substantially convexly arcuate surface of said front member comprises a rearwardly sloping lower front area, a generally horizontal top rear portion, a pair of generally vertical planar side surfaces, and a convex central forward surface which is smoothly faired into said lower front area, said horizontal top rear portion, and said side surfaces.

9. The fairing of claim 8 wherein said planar side surfaces extend divergently rearward from said lower front area and said convex central forward surface and wherein said side edges are inclined rearwardly from vertical.

* * * * *

UNITED STATES PATENT AND TRADEMARK OFFICE
CERTIFICATE OF CORRECTION

PATENT NO. : 4,408,792

DATED : October 11, 1983

INVENTOR(S) : Patrick F. Sullivan

It is certified that error appears in the above-identified patent and that said Letters Patent is hereby corrected as shown below:

Column 6, Line 4 Change "of"(first occurrence) to --to--.

Signed and Sealed this

Twenty-fourth Day of January 1984

[SEAL]

Attest:

GERALD J. MOSSINGHOFF

Attesting Officer

Commissioner of Patents and Trademarks